April 6, 1965  H. MÜLLER ETAL  3,176,799
FLUID FLOW BRAKE WITH MEANS FOR CONTROLLING
THE BRAKING ACTION THEREOF
Filed Nov. 13, 1962  2 Sheets-Sheet 1
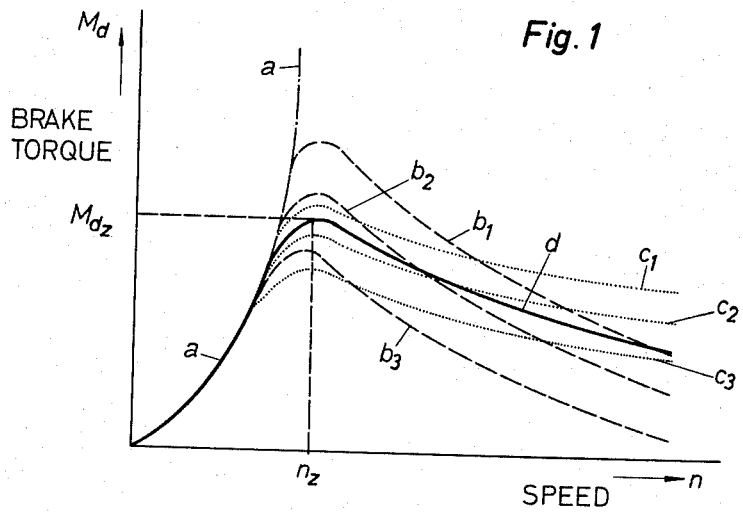
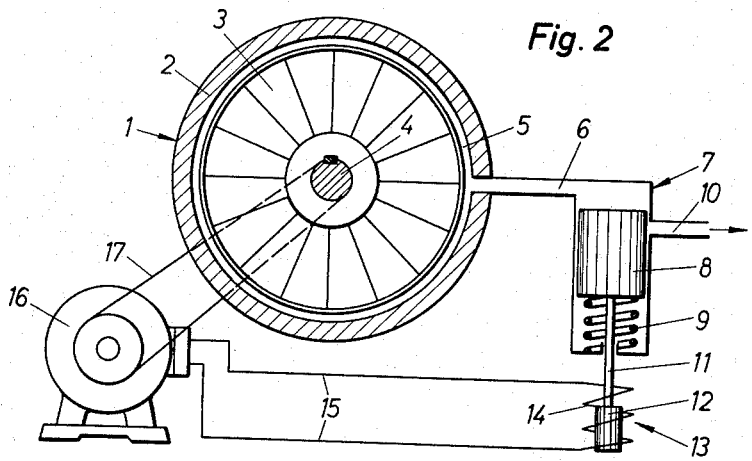
INVENTORS
Helmut Müller
Gerhard Staudenmaier
BY

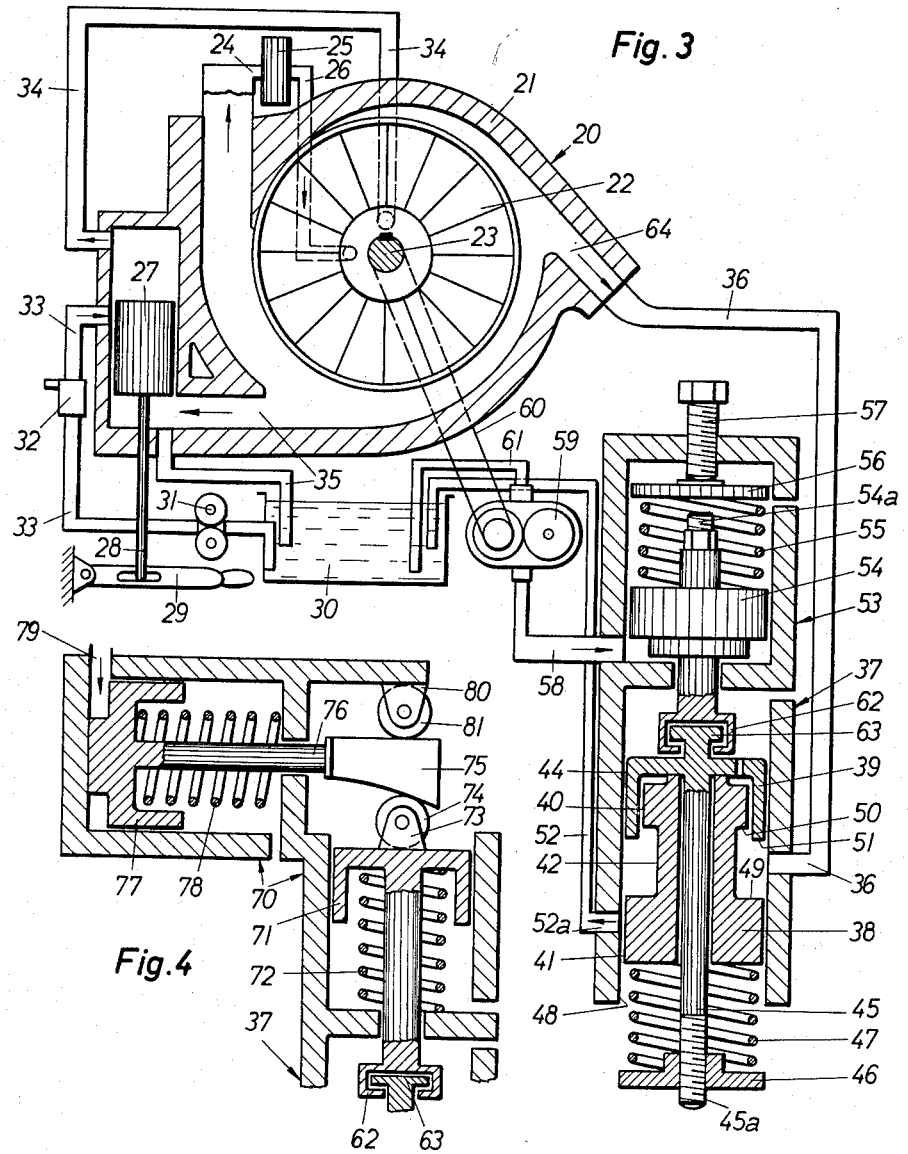

United States Patent Office 3,176,799
Patented Apr. 6, 1965

3,176,799
FLUID FLOW BRAKE WITH MEANS FOR CONTROLLING THE BRAKING ACTION THEREOF
Helmut Müller and Gerhard Staudenmaier, Heidenheim (Brenz), Germany, assignors to Voith-Getriebe KG., Heidenheim (Brenz), Germany
Filed Nov. 13, 1962, Ser. No. 236,809
Claims priority, application Austria, Nov. 14, 1961, A 8,566/61
8 Claims. (Cl. 188—90)

The present invention relates to a fluid flow brake and, more specifically, to a fluid flow brake with means for limiting the braking power, especially for use in connection with rail vehicles.

Fluid flow brakes are frequently so designed that their braking power will reach its maximum not at the maximum permissible driving speed but at a lower driving speed. In particular, with rail vehicles, a fluid flow brake is supposed to absorb the full braking power at low driving speeds, for instance, at a speed amounting to 25% of the maximum speed. Therefore, care has to be taken that at a speed higher than that at which the fluid brake absorbs its full power while being filled, the braking power will not exceed the maximum permissible value. In other words, care has to be taken that from this speed on, the braking torque will be reduced. To this end, it is known to reduce the degree of filling of the fluid flow brake.

In order to be able, when the driving speed changes, always to exploit the full braking power by changing the degree of filling, this control and a corresponding control of the brake filling should be effected automatically. Theoretically, it would appear that, primarily, the pressure of the fluid in the working chamber of the fluid flow brake could be considered an indication for the power absorption. However, experience has shown that such power limitation does not work with sufficient precision and operates frequently in such a way that at medium driving speeds at which, sometimes, long downhill drives are carried out, the maximum braking power of the fluid brake is not obtained and thus cannot be taken advantage of.

A number of reasons were found for the fact that in spite of the theoretically correct control of the fluid flow brake in conformity with the pressure in the working chamber of the brake, the power limitation is still not sufficiently precise and that in spite of the said control, still rather undesirable braking power losses and braking peaks could occur. These reasons are seen primarily in the variable viscosity and varying air content of the working fluid, and in the partial emerging of the blading of the fluid brake from the working fluid, and also in a relatively high wall friction factor of the working fluid when the brake is only partially filled.

It is, therefore, an object of the present invention to provide a fluid flow brake which will overcome the above-mentioned drawbacks.

It is another object of this invention to provide a fluid flow brake which will make it possible, in a simple manner and without undue expense, to assure a safe power limitation which will also be precise at variable speeds.

These and other objects and advantages of the invention will appear more clearly from the following specification in connection with the accompanying drawings, in which:

FIGURE 1 illustrates a speed-torque diagram of a fluid flow brake with the characteristic curves of constant spring pre-load of the discharge element and with the characteristic curve obtainable in conformity with the present invention;

FIGURE 2 diagrammatically illustrates a fluid flow brake with an electrically controlled discharge device;

FIGURE 3 diagrammatically illustrates in section a fluid flow brake according to the present invention with filling and cooling devices and a discharging device which is hydraulically controlled by means of an adjusting member;

FIGURE 4 illustrates a modification of the adjusting member according to FIGURE 3.

The present invention is characterized primarily in that with a fluid brake having a discharge member adapted to be opened in conformity with the pressure in the working chamber of the brake and adapted to be closed by a spring or the like, there are additionally provided means which are operable in conformity with the speed of the brake shaft and with increasing speed of the brake shaft exert a variable additional force upon the discharge member in such a way that at least within a certain speed range, a certain brake power value, for instance, a maximum admissible brake power value, will be held substantially constant.

Thus, with such a discharge member, the pressure in the working chamber of the fluid brake is no longer the sole critical factor for a change in the filling and thus for a change in the braking power. Instead, also a second critical factor becomes influential which second factor is dependent on the brake shaft speed and affects said first critical factor. Depending on whether from that speed on at which the said certain, for instance the maximum permissible braking power value, will be obtained, the heretofore known discharging member brings about that the braking power value will be below or above said certain braking power value. According to the present invention, the additional force acting upon the discharge member will have superimposed thereon another speed dependent force in the closing or opening direction in such a way that the product of speed and torque (equalling braking power) will remain substantially constant.

With high braking powers, for instance also with fluid flow brakes in which, according to a previous suggestion, the radial outer inner confinement of the working chamber is spirally designed for reason of a simple but nevertheless high fluid circulation and therefore of a sufficient heat conduction also at partial filling, such high pressures occur in the working chamber that with a discharge member comprising an ordinary piston, the spring or the like will require too large dimensions. In this instance, in addition to reducing the effective piston surface by a piston rod connected to the piston and having a large diameter, according to the present invention an outlet member of the overflow valve is employed in the form of a piston with two different surfaces acted upon in opposite direction by the pressure in the working chamber of the brake.

According to a further development of the invention, there is provided a compensating piston which is rigidly connected with the support of the spring. The surface acted upon of said compensating piston substantially equals the difference between the two acted upon piston surfaces of the stepped piston. The said compensating piston is so arranged and acted upon by the pressure in the working chamber of the fluid flow brake that said pressure acts in a direction opposite to the direction in which the pressure acts upon the larger surface of said stepped piston. This arrangement brings about that the adjusting member for controlling the control of the overflow valve is now fully relieved from the pressure acting upon the discharge member and that consequently, for purposes of controlling the discharge member by the adjusting member, only low forces are employed, practically merely those which are necessary to overcome the piston friction.

Referring now to the drawings in detail and FIG. 1 in particular, the diagram illustrated therein indicates the operation of heretofore known spring-loaded discharge members, and also indicates the problem underlying the present invention and the solution advanced thereto. In this connection, it may be pointed out that a fluid flow brake will with increasing speed $n$ develop a brake torque $M_d$ according to curve $a$ which increases with the second power of the speed. In view of the equation:

$N = n \times M_d$ ($N$=braking power, $n$=speed of the fluid flow brake, and $M_d$=brake torque) with the desired limitation of the braking power to a certain power value N, for instance corresponding to the values $M_{dz}$ and $n_z$, the following equation is obtained:

$$N = M_{dz} \times n_z = n_x \times M_d = \text{constant or } M_d = N/n_x$$

In this equation $n_x$ comprises any speeds in excess of $n_z$. This means that the line of the torque at constant braking power N is a hyperbola.

It has, however, been found in practice with the heretofore known discharging members which are controlled merely in conformity with the pressure in the working chamber of the fluid flow brake and for instance by a spring with a stationary support, depending on the design of the fluid brake, a brake torque limitation is obtained according to curves $b_1$, $b_2$ or $b_3$ (depending on the stiffness of the spring) on one hand or according to curves $c_1$, $c_2$ or $c_3$ (again in conformity with the spring stiffness) on the other hand. The above-mentioned $b$-curves could occur for instance with a fluid brake with spirally designed radial outer inner delimitation of the working chamber, whereas the $c$-curves could occur with an ordinary fluid brake. Both groups of curves $b$ and $c$ differ from the curve $d$ for the above-mentioned reasons and do not correspond to constant braking powers.

The problem underlying the present invention consists in so designing the fluid brake that brake power confining curves are obtained in conformity with the curve $d$. More specifically, as will be evident from the location of curve $d$ with regard to the curves $b$ and $c$, it is desired that from speed $n_z$ on of the brake shaft, a transformation from one spring characteristic (for instance $b_2$) to the spring characteristic of a stronger spring ($b_1$) will occur. In other words, at a speed increasing from the value $n_z$, the spring preload is to increase, if possible in a continuous manner. In order to obtain a filling control of a fluid flow brake in conformity with curve $d$, it is suggested according to the present invention to superimpose a second force upon the force originated by the pressure in the working chamber of the fluid flow brake.

An arrangement for superimposing such second force is diagrammatically illustrated in FIG. 2. This arrangement comprises a fluid flow brake 1 of which merely the housing 2, the driven blade wheel 3 and the brake shaft 4 connected to the latter has been illustrated. The other parts including the filling, discharging and cooling devices have been omitted. The fluid flow brake 1 will, when in operation, create in working chamber 5 a pressure which is dependent on the brake shaft speed and the degree of filling. This pressure is through a conduit 6 conveyed to an overflow valve 7 where it acts upon a piston 8 against the thrust of a spring 9, said piston 8 acting as a discharge member.

When a certain pressure in the working chamber 5 is exceeded, this pressure moves piston 8 against the thrust of spring 9 so that a discharge conduit 10 will be freed through which working fluid will flow off until the said certain pressure has again been established.

As will be evident from the drawing, piston 8 is, through a connecting rod 11, connected to an armature 12 of an electromagnet 13. The winding 14 of electromagnet 13 is, through conductors 15, connected to a measuring generator 16 which latter is through a transmission belt 17 drivingly connected to the brake shaft 4 and thus will in the winding 14 create a voltage which depends on the speed of the brake shaft 4. Consequently, the movement of piston 8 caused by the pressure in the working chamber 5 of the fluid brake 1 and by the thrust of spring 9, will be modified by the application of a force electromagnetically. It will be appreciated that with increasing speed of shaft 4 and thus with increasing speed of generator 16 the electromagnetic force of magnet 13 will be increased thereby causing piston 8 to free passage 10 to an increasing extent, i.e. to move piston 8 in opening direction. The measuring generator 16 and the electromagnet 13 are so designed that curve $d$ of FIG. 1 will be realized which means that in all ranges of operation of the fluid brake above the speed $n_z$, the full braking power can be exploited.

A further embodiment of an overflow valve according to the present invention is illustrated in FIG. 3. FIG. 3 shows the housing 21, the primary wheel 22, the driving (brake) shaft 23 of a fluid flow brake 20, and the filling control and working fluid cooling device as well as the overflow valve 37/53.

With regard to the cooling device, the following remarks may be in order. With fluid flow brakes which have their maximum braking power already at low speeds, it is necessary for instance considerably to reduce the filling at high speeds (in the extreme instance up to 1%) in order to make sure that the maximum permissible braking power will not be exceeded. Such filling control is obtained by the regulation means according to the invention. In order, in this connection nevertheless to assure a proper heat deduction which has to be as high as with complete filling and maximum braking power, the radial outer inner delimitation of the working chamber is, as evident in FIG. 3, designed spirally, while additionally a short circuited cooling circuit is provided (see FIG. 3 conduit 24, cooler 25 and conduit 26). In this way, a considerable fluid circulation through the cooler will be assured even at the lowest degree of filling.

Furthermore it shall be possible to obtain braking at partial loads. To accomplish this in addition to the regulation means which are the subject of the invention further regulation means are required. In conformity with FIG. 3, the filling control device for partial loads is separated from the cooling circuit and comprises a piston 27 which, through the intervention of a connecting rod 28, is operable by a manually operable lever 29. Piston 27 controls the delivery into the working chamber 20a of the fluid brake by means of a delivery pump 31 driven by an electric motor 31a and having its suction line connected to an oil sump 30, through a pressure relief valve 32 and two conduits 33, 34. Said piston 27 furthermore controls the quantity of discharge through conduit 35 into the oil sump 30.

The working fluid in the working chamber of brake 20 is furthermore passed through a conduit 36 to a portion 37 of the overflow valve, which includes a discharge member, and acts upon a stepped piston 38 serving as discharge member and having three cylindrical surfaces 40, 41 and 42. The working fluid furthermore acts upon a compensating piston 39. A further feature of the invention consists in displaceably and sealingly arranging the compensating piston 39 on one of said cylindrical surfaces with the exception of that cylindrical surface 41 which has the largest diameter. In other words, compensating piston 39 may be displaceably and sealingly arranged on the cylindrical surface 40. The outer diameter 44 of the compensating piston 39 substantially equals the outer diameter of that cylindrical surface namely surface 41 which has the largest diameter. In conformity with the present invention, the conduit 36 coming from the working chamber of the fluid brake 20 is so connected to the overflow valve 37 that conduit 36 leads into the pressure chamber of the discharge member within the range between the cylindrical surface 41 having the largest diameter, and the compensating piston 39. Furthermore, in conformity with the present invention the compensating piston 39 is, through the intervention of a rod 45, rigidly connected with a support 46 for the spring 47, said rod 45 being displaceably mounted in an axial bore 38a of piston 38. Compensating piston 39 as well as cylindrical surface 41 of piston 38 are guided on the inner cylindrical surface 48 of part 37 housing the discharge member. The part 37 is provided with a discharge opening 52a having connected thereto a conduit 52 leading to the sump 30.

As will be evident from the drawing, the pressure forces acting upon the surfaces 49, 50, 51 of the stepped piston 38 and compensating piston 39 balance each other in view of the fact that the magnitude of the surface 49 acted upon by the forces in one direction equals the total of the magnitude of the surfaces 50 and 51 acted upon by the forces in the opposite direction. Nevertheless, depending on the magnitude of the pressure in conduit 36, the relative position of the piston 38 and the compensating piston 39 varies because the compensating piston 39 is displaced upwardly by a force corresponding to its effective surface 51, whereas piston 38 is displaced downwardly by a force corrsponding to the difference between surface 49 and surface 50 (differential area 51 of the compensating piston). This displacement upwardly and downwardly continues until both forces balance the thrust of spring 47. Depending on the magnitude of this pressure in conduit 36, piston 38 is, as the case may be, displaced downwardly to such an extent that the opening 52a is freed. The working fluid may then pass from the working chamber of the brake through conduits 36 and 52 into the oil sump 30, the filling of the fluid brake decreases and consequently also the braking power.

The above described arrangement of the compensating piston 39 around the piston 38 and not for instance adjacent thereto brings about an advantageous saving in space.

In view of the various control positions, it is advantageous to displaceably arrange the support 46 for spring 47 on rod 45. This may be effected for instance by means of a screw 45a. It is also possible to vary the pre-load of spring 47 if this should be necessary or desirable.

Part 37 which receives the discharge member is structurally combined with a hydraulically operable adjusting member 53 so as to form a structural unit therewith. Adjusting member 53 comprises an adjusting element 54 in the form of a piston which by means of a spring 55 is biased in a direction opposite to the direction in which the fluid pressure acts upon said piston. A support 56 for spring 55 is adjustable by means of a screw 57 so that also the pre-load of spring 55 may be varied in conformity with the requirements. Similarly, in order to be able to adapt piston 54 to the requirements of the control of the overflow valve, the adjusting element 54 is provided with a screw 54a which determines the respective maximum stroke of the adjusting element 54. The adjusting element 54 is acted upon by a pressure medium which is conveyed through a conduit 58 and the pressure of which depends on the speed of a measuring pump 59 which is driven by brake shaft 23 through the intervention of a transmission belt 60 and draws fluid from a sump 30 through a conduit 61. The adjusting element 54 is connected through a positive coupling 62/63 with the compensating piston 39 and thereby with the piston 38.

The movement of the adjusting element 54 in conformity with the pressure in conduit 58, i.e. in conformity with the speed of the brake shaft 23 thus brings about an adjustment of the compensating piston 39 and of piston 38 and, consequently, a change in the control characteristic of the discharge member. If, for instance, the pressure in conduit 58 increases in view of a higher speed of brake shaft 23, pistons 54, 39 and 38 are displaced in upward, i.e. in closing direction. In this position, a pressure higher than the previous pressure becomes necessary in conduit 36 in order to free opening 52a for purposes of reducing the filling. In this way, the requirement referred to above in connection with FIG. 1 has been met and it is thus possible to obtain a substantially hyperbolic control curve.

The discharge member illustrated in FIG. 3, which is designed as a piston 38 and is rigidly connected to the adjusting element 54, is particularly suitable for a brake the radial outer inner de-limitation of which concerning the working chamber is spirally designed. This is due to the fact that the deviation of the curves $d$ on one hand and of the curves $b_1$, $b_2$ and $b_3$ (FIG. 1) on the other hand, from each other are in this instance sometimes not very material. In view of the pressure values in the working chamber at different speeds and degrees of filling with a fluid flow brake having a working chamber designed as outlined above with a filling control device the control outlet of which is arranged substantially at the outer diameter of the working chamber while a separate short circuited cooling circuit is provided for the working fluid the exit portion of which is likewise located on the outer diameter of the working chamber, it is particularly advantageous, in conformity with a further feature of the present invention, to provide the outlet opening in the working chamber for controlling the outlet element, substantially within the first third of the spiral especially at 64. In this instance, the control outlet 35 of the filling control device should preferably be provided in the second third of the spiral, while the exit point 24 of the cooling circuit should be provided in the third portion of the spiral as indicated in FIG. 3. Such an arrangement will bring about that the various withdrawing points in the working chamber will not interfere with each other.

Instead of the rigid connection of discharge element and control element by means of a coupling, also a cam control may be employed. In such an instance, for instance, the support for the spring is proportionally adjusted in conformity with the displacement of the adjusting element.

With fluid flow brakes with ordinary outer de-limitation of the working chamber, i.e. (not spiral), due to other pressure conditions in the working chamber, the deviation of the curves $d$ on one had and $c_1$, $d_2$ and $c_3$ on the other hand (FIG. 1) is sometimes considerable. In such an instance, it is not possible by means of an adjusting element rigidly connected to the discharge member (see FIG. 3) to obtain a satisfactory power limitation of the fluid brake in conformity with a hyperbola. In order to obviate this possible defect and to obtain a precise power limitation according to a hyperbola for all occurring designs of the working chamber, at least within certain speed ranges, according to the present invention a cam control for the discharge member is suggested the shape of which will permit any desired adjusting characteristic of the support for the spring in conformity with the position of the adjusting element. It will then also be possible for fluid brakes of various power, magnitude and design to produce a standard overflow valve which as to its function is adapted to the respective fluid brake merely by providing a special cam disc. Such a modification is illustrated in FIG. 4. While the discharge element with coupling 62, 63 remains the same as described in connection with FIG. 3, according to FIG. 4 the coupling portion 62 is connected to a guiding piston 71 which is biased by a spring 72. At the upper surface of piston 77 there is provided a roller support 73 carrying a roller 74. On this roller 74 there slides a cam 75 which through the intervention of a rod 76 is connected to an adjusting element 77 biased by a spring 78. The adjusting element 77 is subjected to the pressure furnished by pump 59 and conveyed through piston 77 through a conduit 79. Cam 75 is furthermore guided by further roller means 81 mounted on an opposite support 80.

Cam 75 may be so designed that in all ranges of operation of the fluid brake a maximum permissible braking power will not be exceeded. The magnitude of the deviation of the proportionality between the pressure in the working chamber of the fluid brake and the absorbed braking power (inherent to the design of the brake, degree of filling etc.) is absolutely irrelevant inasmuch as each deviaiton may be compenasted for by a correspondingly designed cam. Expressed differently it may be said that the curves b and c of FIG. 1 may have any desired shape. At any rate, in view of the correspondingly designed cam it is possible to obtain the curve d.

It is, of course, to be understood that the present invention is, by no means, limited to the particular constructions shown in the drawings but also comprises any modifications within the scope of the appended claims.

What we claim is:

1. A fluid flow brake having a rotatable shaft, which comprises: a housing confining a working chamber, passage means communicating with said working chamber and having an outlet opening for discharging fluid from said working chamber, first control means for controlling said outlet opening, spring means biasing said first control means in a direction for closing said opening, said first control means having surface means exposed to the fluid pressure in said working chamber and being operable in response to a certain minimum fluid pressure in said working chamber to move in a direction against the thrust of said spring means, and second control means operatively connected to said shaft and to said first control means and operable in response to a certain minimum speed of said shaft to adjust said first control means for controlling the flow of fluid from said working chamber through said outlet opening in order to maintain the braking power of said fluid brake at a predetermined substantially constant value over at least a certain range of angular speed of said shaft, said second control means being independent of the influence of said spring means and of said fluid pressure in said working chamber.

2. A fluid flow brake having a rotatable shaft, which comprises: a housing confining a working chamber, passage means communicating with said working chamber and having an outlet opening for discharging fluid from said working chamber, first control means for controlling said outlet opening, spring means biasing said first control means in a direction for closing said opening, said first control means having surface means exposed to the fluid pressure in said chamber and being operable in response to a certain minimum fluid pressure in said chamber to move in a direction for opening said outlet opening, and second control means operatively connected to said shaft and said first control means and operable in response to a certain minimum speed of said shaft to move in a direction for closing said outlet opening to thereby control the flow of fluid from said working chamber through said opening in order to maintain the braking power of said fluid brake at a predetermined substantially constant value over at least a certain range of angular speed of said shaft, said second control means being independent of the influence of said spring means and of said fluid pressure in said working chamber.

3. A fluid flow brake having a rotatable shaft, which comprises: a housing confining a working chamber, passage means communicating with said working chamber and having an outlet opening for discharging fluid from said working chamber, first control means for controlling said outlet opening, spring means biasing said first control means in a direction for closing said opening, said first control means having surface means exposed to the fluid pressure in said working chamber and being operable in response to a certain minimum pressure in said working chamber to move in a direction against the thrust of said spring means, supporting means supporting one end of said spring means, fluid operable second control means operatively connected to said supporting means, and pump means drivingly connected to said shaft and operable to supply actuating fluid to said second control means whereby said second control means is fluid pressure operable in conformity with a certain minimum speed of said shaft in order to maintain the braking power of said fluid brake at a predetermined substantially constant value over at least a certain range of angular speed of said shaft, said second control means being independent of the influence of said spring means and of said fluid pressure in said working chamber.

4. A fluid flow brake having a rotatable shaft, which comprises: a housing confining a working chamber, passage means communicating with said working chamber and having an outlet opening for discharging fluid from said working chamber, first control means comprising a piston element moveable for controlling said outlet opening, spring means biasing said first control means to move in a first direction of causing said piston element to close said opening, said first control means having oppositely effective surface means of different magnitude exposed to the fluid pressure in said working chamber and being operable in response to a certain minimum pressure in said working chamber to move in a second direction against the thrust of said spring means to cause said piston element to open said outlet opening, supporting means for supporting one end of said spring means, compensating piston means operatively connected with said first control means and having an effective surface exposed to the fluid pressure in said working chamber and having an area equalling the difference between said two oppositely effective surface means, said compensating piston means being rigidly connected to said supporting means and having its effective surface so located that the fluid pressure of the working chamber acting thereupon tends to move said compensating piston means in a direction opposite to the direction of movement of said first control means in response to the fluid pressure of said working chamber acting upon the greater surface means of said first control means, and second control means operatively connected to said shaft and also operatively connected to said compensating piston means and being operable in response to a certain minimum speed of said shaft to move said first control means for controlling the flow of fluid from said working chamber through said outlet opening in order to maintain the braking power of said fluid brake at a predetermined substantially constant value over at least a certain range of angular speed of said shaft, said second control means being independent of the influence of said spring means and of said fluid pressure in said working chamber.

5. A fluid flow brake having a rotatable shaft, which comprises: a main housing confining a working chamber, a secondary housing having a cylindrical bore and being provided with a fluid inlet and a fluid outlet, conduit means establishing communication between said working chamber and said fluid inlet, a first control member having a first piston portion slidably and reciprocably engaging said cylindrical bore, said first control member also having a second piston portion of a diameter considerably less than the diameter of said first piston portion while being in axial alignment therewith, a compensating piston being interposed between said second piston portion and the wall of said cylindrical bore and having an outer diameter substantially corresponding to the outer diameter of said first piston portion and having an inner diameter substantially corresponding to the outer diameter of said second piston portion, said compensating piston being slidable in said cylindrical bore relative to said first control member and also being slidable on said second piston portion relative to said first piston portion, an annular chamber being interposed between said first piston portion and said compensating piston and communicating with said fluid inlet and adapted in a certain position of said first piston portion of first control member to communicate with said fluid outlet, spring means having one end thereof acting against said first piston portion, supporting means spaced from said first piston portion for supporting the other end of said spring means, connecting means slidably extending through said first and second piston portions and rigidly connecting said supporting means to said compensating piston, a second control member operatively connected to said compensating piston, said second control member being operable solely in response to a certain minimum speed of said shaft to move said first control means for causing said first piston portion thereof to control the flow of fluid from said working chamber through said outlet opening in order to maintain the braking power of said fluid brake at a predetermined substantially constant value over at least a certain range of angular speed of said shaft.

6. A fluid flow brake having a rotatable shaft, which comprises: a housing confining a working chamber, passage means communicating with said working chamber and having an outlet opening for discharging fluid from said working chamber, first control means for controlling said outlet opening, spring means having one end acting upon said first control means so as to bias the same in a direction for closing said opening, movable supporting means supporting the other end of said spring means, said first control means having surface means exposed to said fluid pressure in said working chamber and being operable in response to a certain minimum fluid pressure in said working chamber to move in a direction against the thrust of said spring means, and second control means operatively connected to said supporting means and also operatively connected to said shaft and to said first control means, said second control means being operable in response to a certain minimum speed of said shaft to bias said first control means for controlling the flow of fluid from said working chamber through said outlet opening in order to maintain the braking power of said fluid brake at a predetermined substantially constant value over at least a certain range of angular speed of said shaft, said second control means being independent of the influence of said spring means and of said fluid pressure in said working chamber.

7. A fluid flow brake having a rotatable shaft, which comprises: a housing confining a sprial-shaped working chamber, a filling device associated with said working chamber for selectively filling the same when braking under partial load, the control outlet of said filling device being located approximately at the outer diameter of the working chamber, short circuited cooling circuit means associated with said working chamber for cooling the working fluid, the exit of said cooling circuit means being likewise located at the outer diameter of said working chamber, passage means communicating with said working chamber and having an outlet opening for discharging fluid from said working chamber, said passage means being connected to said working chamber approximately within the range of the first third of the spiral portion of said working chamber while the control outlet of said filling device is located in approximately the second third of the spiral portion of said working chamber and while the outlet of said cooling circuit means is located substantially within the third of the spiral portion of said working chamber, first control means for controlling said outlet opening, spring means biasing said first control means in a direction for closing said opening, said first control means having surface means exposed to the fluid pressure in said working chamber and being operable in response to a certain minimum fluid pressure in said working chamber to move in a direction against the thrust of said spring means, and second control means operatively connected to said shaft and to said first control means and operable in response to a certain minimum speed of said shaft to bias said first control means in a direction for controlling the flow of fluid from said working chamber through said outlet opening in order to maintain the braking power of said fluid brake at a predetermined substantially constant value over at least a certain range of angular speed of said shaft, said second control means being independent of the influence of said spring means and of said fluid pressure in said working chamber.

8. A fluid flow brake having a rotatable shaft, which comprises: a main housing confining a working chamber, a secondary housing having a cylindrical bore and being provided with a fluid inlet and a fluid outlet, conduit means establishing communication between said working chamber and said fluid inlet, a first control member having a first piston portion slidably and reciprocably engaging said cylindrical bore, said first control member also having a second piston portion of a diameter considerably less than the diameter of said first piston portion while being in axial alignment therewith a compensating piston being interposed between said second piston portion and the wall of said cylindrical bore and having an outer diameter substantially corresponding to the outer diameter of said first piston portion and having an inner diameter substantially corresponding to the outer diameter of said second piston portion, said compensating piston being slidable in said cylindrical bore relative to said first control member and also being slidable on said second piston portion relative to said first piston portion, an annular chamber being interposed between said first piston portion and said compensating piston and communicating with said fluid inlet and adapted in a certain position of said first piston portion of first control member to communicate with said fluid outlet, spring means having one end thereof acting against said first piston portion, supporting means spaced from said first piston portion for supporting the other end of said spring means, connecting means slidably extending through said first and second piston portions and rigidly connecting said supporting means to said compensating piston, a second control member operatively connected to said compensating piston, said second control member being operable solely in response to a certain minimum speed of said shaft to move said first control means for causing said first piston portion thereof to control the flow of fluid from said working chamber through said outlet opening in order to maintain the braking power of said fluid brake at a predetermined substantially constant value over at least a certain range of angular speed of said shaft, said second control member comprising fluid pressure responsive means, pressure fluid supply means drivingly connected to said shaft and having its delivery side communicating with said fluid pressure responsive means, additional spring means biasing said second control member in a direction opposite to the biasing action of said first control means, and means for selectively adusting the thrust of at least one of said first mentioned spring means and said second mentioned spring means.

References Cited by the Examiner

UNITED STATES PATENTS

| 2,162,541 | 6/39 | Walker | 188—90 |
| 2,551,677 | 5/51 | Hoffstrom | 188—90 |
| 3,033,321 | 5/62 | Evans et al. | 188—90 |
| 3,051,273 | 8/62 | Cordiano et al. | 188—90 |

FOREIGN PATENTS

| 482,428 | 3/38 | Great Britain. |

ARTHUR L. LA POINT, *Primary Examiner.*